Feb. 16, 1960     A. L. LEE     2,925,136
FOUR WHEEL DRIVEN MINE HAULAGE VEHICLE WITH
PLURAL PROPULSION UNIT COMPARTMENTS
Original Filed Aug. 31, 1951     4 Sheets-Sheet 1
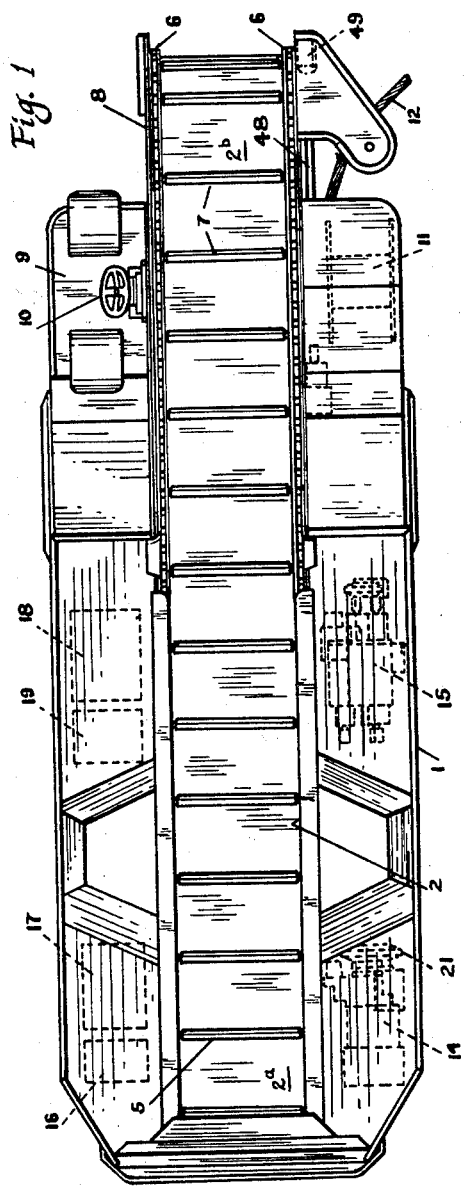
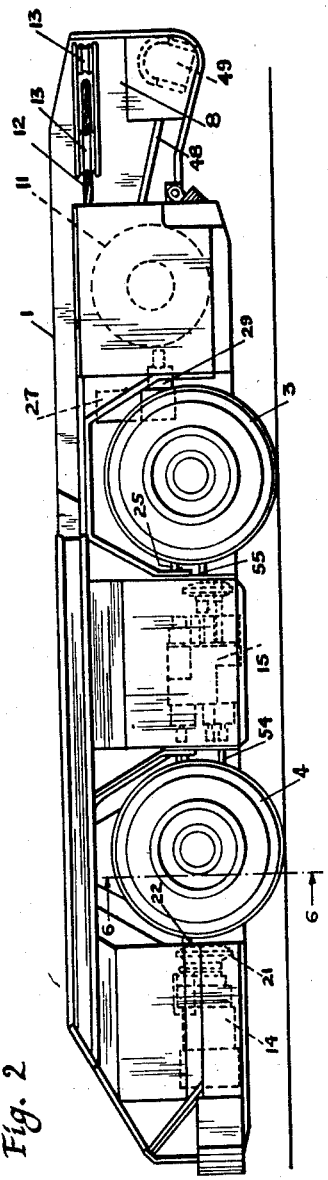
INVENTOR.
Arthur L. Lee
BY Stanley J. Price Jr.
his ATTORNEY

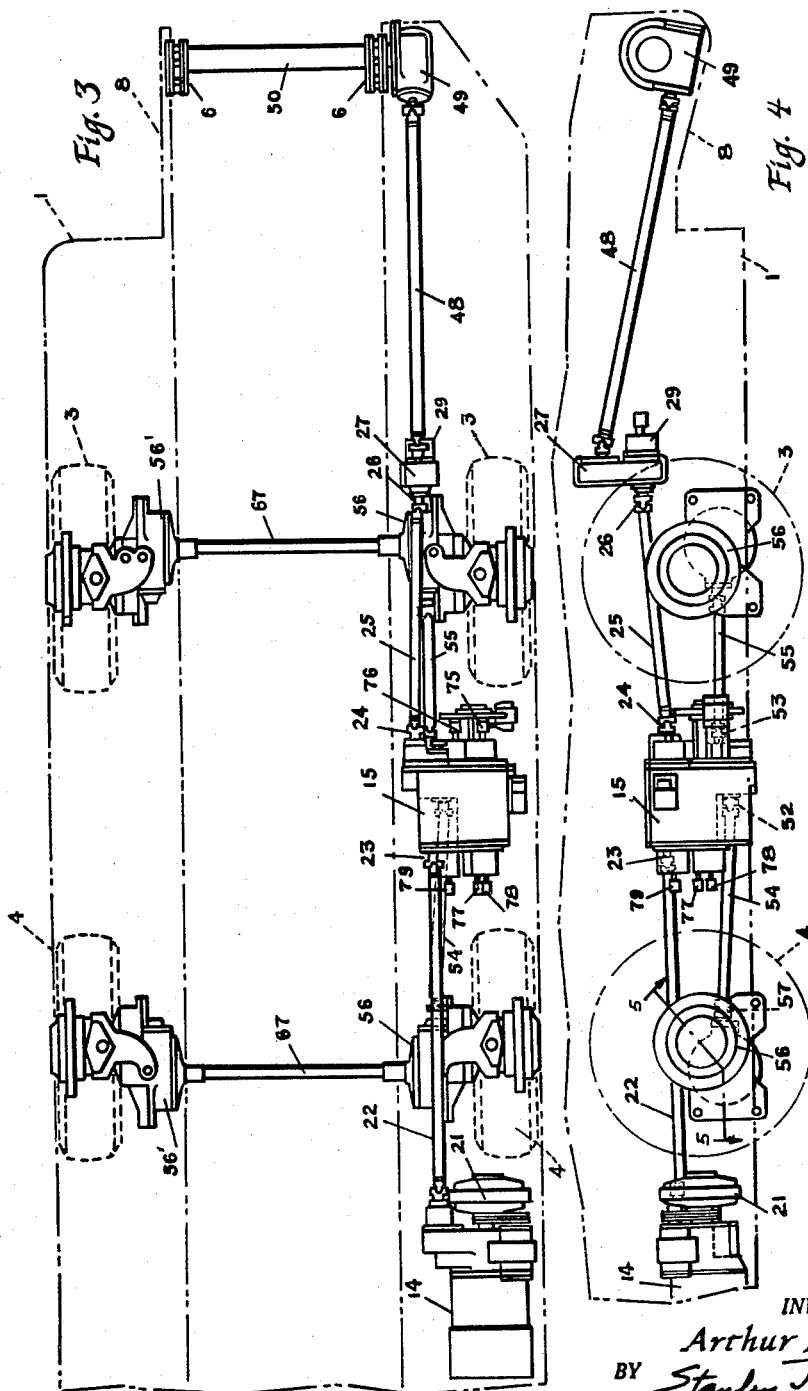

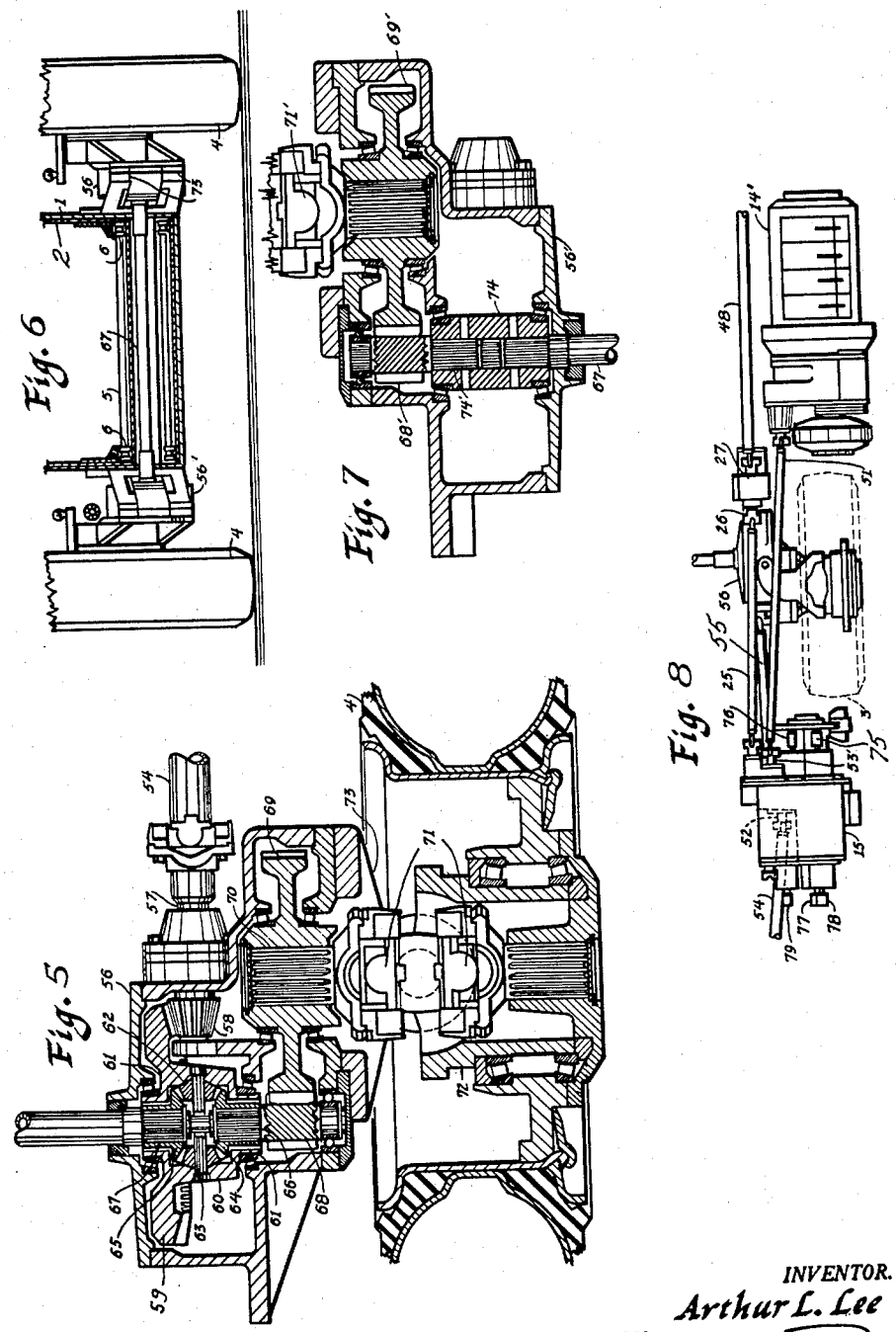

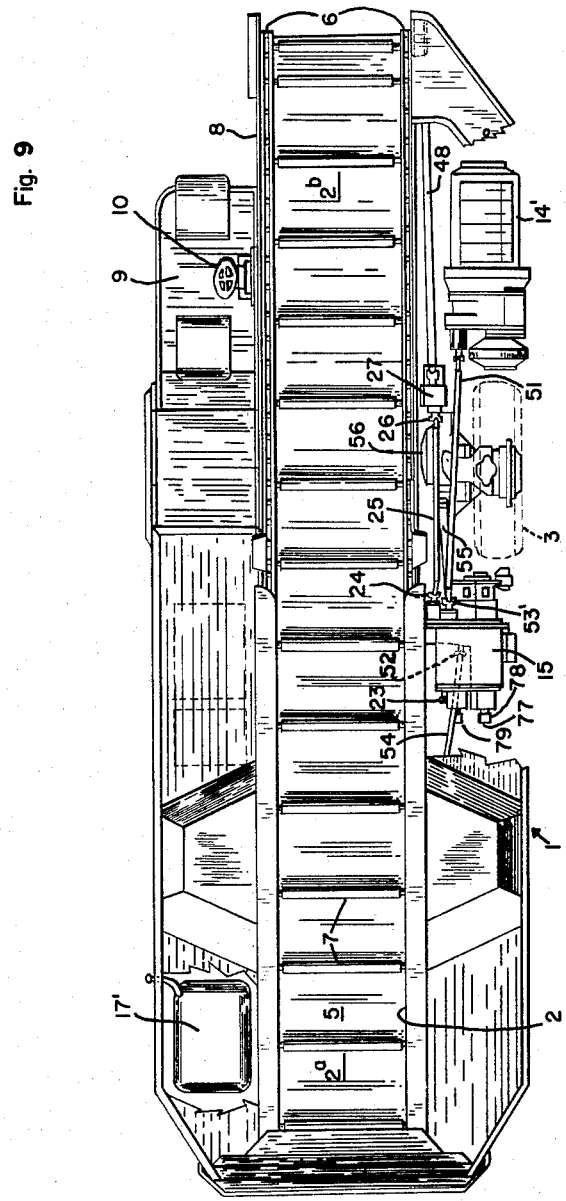

2,925,136

FOUR WHEEL DRIVEN MINE HAULAGE VEHICLE WITH PLURAL PROPULSION UNIT COMPARTMENTS

Arthur L. Lee, Columbus, Ohio, assignor to Consolidation Coal Company, Pittsburgh, Pa., a corporation of Pennsylvania Continuation of abandoned application Serial No. 559,592, January 17, 1956, and abandoned application Serial No. 535,919, September 22, 1955, both being divisions of application Serial No. 244,549, August 31, 1951, now Patent No. 2,754,015, dated July 10, 1956. This application August 13, 1958, Serial No. 754,790

7 Claims. (Cl. 180—49)

This invention relates to automotive vehicles and more particularly to a mine haulage vehicle of the type commonly known as a "shuttle car" especially designed for use in hauling loose material in underground mines.

This application is a continuation of my copending application Serial No. 559,592, filed January 17, 1956; and a continuation of my copending application Serial No. 535,919, filed September 22, 1955, both of the last named applications having since become abandoned and being divisions of application Serial No. 244,549, filed August 31, 1951, now Patent No. 2,754,015, and assigned to the assignee of the present invention.

An object of the present invention is to provide an improved automotive vehicle.

Another object is to provide an improved mine haulage vehicle of the type commonly known as a "shuttle car" having novel features of construction.

A further object is to provide an improved automotive vehicle having propelling and steering means such as traction and steering wheels and improved driving means therefor.

A still further object is to provide an improved automotive vehicle which has improved propelling means adapted to be driven by alternative sources of power such as A.C. or D.C. electric motors or an internal combustion engine.

These and other objects and advantages of the invention will, however, hereinafter more fully appear.

In the accompanying drawings there is shown for purposes of illustration one form which the invention may assume in practice.

In these drawings:

Figure 1 is a plan view and Figure 2 is a side elevational view of a mine haulage vehicle in which a preferred illustrative form of the invention is embodied.

Figure 3 is a somewhat schematic view with the vehicle body in outline and showing portions of the driving means for the traction wheels and the conveyor.

Figure 4 is a schematic side view, similar to Figure 3, showing the vehicle in side elevation.

Figure 5 is an enlarged developed section taken substantially on the planes of line 5—5 of Figure 4, showing details of the drive for one of the traction wheels.

Figure 6 is an enlarged fragmentary cross section taken on line 6—6 of Figure 2.

Figure 7 is a detail section taken on the plane of Figure 5, showing the drive for an opposite traction wheel.

Figure 8 is a fragmentary view of a portion of the structure shown in Figure 3, illustrating the connection with an alternate power source.

Figure 9 is a plan view similar to Figure 1 with portions of the body broken away to illustrate a haulage vehicle having an internal combustion engine as an alternative power source.

The several features of the invention, as shown in the drawings, are embodied in a mine haulage vehicle of the kind commonly known as a "shuttle car" especially designed for use in transferring loose material in underground mines, and while such features are especially adapted to use with such a vehicle they are also adapted to use with automotive vehicles of other types.

The mine haulage vehicle disclosed herein generally comprises a body 1 having a material receiving compartment 2 with a material receiving end portion 2a and a material discharging end portion 2b. The body 1 is mounted on pairs of front and rear traction and steering wheels 3 and 4, with the compartment 2 extending longitudinally between the wheels in the manner shown in Figures 1, 6 and 9. Extending along the bottom of the compartment is a conventional endless flight conveyor 5 having endless side chains 6 suitably guided within guideways within the body and to which usual cross flights 7 are connected. The discharge end of the conveyor extends along a tiltable end frame 8 which is tiltable to effect variation in the discharge height of the conveyor. Arranged at one side of the discharge end of the vehicle body is a compartment 9 which provides a station for the operator and which has therein a steering wheel 10 and other conveniently arranged controls whereby the vehicle may be operated and steered. Arranged at the opposite side of the discharge end of the body is a conventional electric cable reel 11 on which a power conductor cable 12 is wound, and the tiltable end frame 8 carries suitable guides 13 for the cable, whereby the latter may be extended in various directions from the vehicle into connection with a suitable source of electric power such as a main power line. Arranged at one side of the opposite end of the body is an electric motor 14 which may be either of the A.C. or D.C. type. Arranged at the same side of the body, between the front and rear wheels, is a selective multi-speed automotive transmission 15. Located at the side of the body opposite from the motor 14 is a storage battery 16 and an electric control apparatus 17, while arranged between the front and rear wheels at this side of the body is a liquid tank 18 and a control valve apparatus 19, both associated with the selective multi-speed transmission 15 as later explained.

Now referring to the conveyor and wheel drives of the vehicle it will be noted that the motor 14 is connected through a coupling or clutch 21 to a universal shafting 22 extending longitudinally within the body at one side of the compartment and this shafting is, in turn, connected to the input shaft 23 of the selective transmission. The input shaft 23 extends toward the body material receiving end portion 2a. The transmission 15 has in addition to the input shaft 23 another input shaft 53 which extends toward the body material discharging end portion 2b in a direction opposite to the transmission input shaft 23 (Figs. 8 and 9). An output shaft 24 of the transmission is connected by universal shafting 25 to a shaft 26 of a reduction gearing contained in a housing 27 suitably mounted on the adjacent side of the vehicle body. As illustrated, the shaft 26 is suitably journaled within the gear housing 27. A friction clutch 29 serves frictionally to connect the shafts 26 and universal shafting 48 for rotation in unison. This universal drive shafting 48 is connected to a conventional speed reducer 49 which drives a cross shaft 50 suitably journaled within the tiltable end frame 8. Chain sprockets suitably secured to this cross shaft engage and drive the endless side chains 6 of the conveyor. The universal shafting 48 permits tilting of the end frame 8 of the vehicle, to adjust the discharge end of the conveyor, while maintaining the drive.

As shown in Figures 8 and 9 the haulage vehicle may be easily modified from an electric motor driven vehicle to a combustion engine driven vehicle. This is due to the specific construction of the haulage vehicle body and the arrangement of the drive components thereon. To so modify the haulage vehicle the cable reel 11 and electric control apparatus 17 are removed from the body 1. An internal combustion engine indicated as 14' in Figures 8 and 9 is placed in the space previously occupied by the cable reel 11. A fuel tank 17' operable to supply fuel to the internal combustion engine 14' is positioned in the space provided for the electric control apparatus 17. Conduits (not shown) interconnect the fuel tank 17' with the internal combustion engine 14'.

Universal shafting 51 connects the input shaft 53' with the internal combustion engine 14' so that the internal combustion engine 14' may drive the transmission 15. Universal shafting 22 between the electric motor 14 and the transmission input shaft 23 is disconnected. Thus by substituting an internal combustion engine 14' for the cable reel 11 and a fuel tank 17' for the electric control apparatus 17 the haulage vehicle can be changed from an electrically driven vehicle to a vehicle driven by an internal combustion engine.

Output shafts 52 and 53 are driven by the terminal element of the selective transmission 15 and are connected by oppositely extending universal drive shaftings 54 and 55 respectively, to gear housings 56 arranged at one side of the vehicle body, as shown in Figure 3. These gear housings are suitably rigidly secured to the adjacent side of the vehicle body and each includes, as shown in Figure 5, a drive shaft 57 having a beveled pinion 58 secured thereto and meshing with and driving a beveled gear 59, the latter, in turn, secured to a differential housing 60 having hub portions 61 suitably journaled with the gear housing. Beveled planet gears 62 of the differential are journaled on radial shafts 63 suitably supported within the differential housing and meshing with coaxial beveled gears 64 and 65 suitably journaled within the hub portions of the differential housing 60 (Figure 5). These beveled gears 64 and 65 are keyed to the adjacent ends of aligned horizontal shafts 66 and 67 respectively, and the shaft 66 is suitably journaled within the gear housing 56 and has secured thereto a spur pinion 68 meshing with a spur gear 69 having its hub journaled within the gear housing 56 and keyed to a parallel shaft 70. The shaft 70 drives through a conventional universal joint structure 71 the hub 72 of the adjacent wheel. The wheel is mounted in a known manner on brackets 73 secured to the adjacent side of the vehicle body and these brackets provide an upright pivotal mounting, in alignment with the universal joint structure, whereby the wheel may be turned horizontally in the usual manner to effect steering. The steering gear connected to each traction wheel is conventional and is herein purposely omitted to facilitate illustration.

As shown in Figure 6, the aligned cross shaft 67 extends transversely of the lower portion of the vehicle body beneath the bottom of the compartment and is arranged intermediate the upper and lower runs of the conveyor, and is suitably journaled in a gear housing 56' arranged at the opposite side of the body. This housing is similar to the housing 56 but, in this instance, the differential is omitted so that a pair of wheels is driven through a differential located at one side of the vehicle body. The shaft 67 is coupled at 74 to an aligned shaft 74' suitably journaled within the gear housing 56' (see Figure 7), and secured to the shaft 74' is a spur pinion 68' meshing with a spur gear 69' likewise having its hub journaled within the gear housing 56' and similarly connected through a universal joint structure 71' to the adjacent traction wheel. The other pair of wheels is mounted and driven in an identical manner.

From the foregoing description, it will be evident that the pairs of front and rear wheels 3 and 4 may be concurrently driven and turned horizontally in unison about their swivel mountings, to effect propulsion and steering of the vehicle, and may be driven selectively at different predetermined speeds and in either direction at any speed through the selective transmission 15 while the electric motor 14 may run at a constant speed. Of course when an A.C. motor or a diesel engine is employed, a variable speed drive may also be effected by conventional appropriate control of the motor or engine as desired. It will be noted that the selective transmission 15 is arranged in a relatively low position on the vehicle body down between the front and rear wheels at one side of the body, in such manner as to provide direct drives with the wheels as well as to provide an extremely compact arrangement. The selective transmission 15 may include selective speed controlling clutches 75, 76 and 77 and forward and reverse clutches 78 and 79. Since this transmission may assume any appropriate form and does not per se enter into the present invention, further detail description thereof is herein considered unnecessary.

While there is in this application specifically described one form which the invention may assume in practice, it will be understood that this form of the same is shown for purposes of illustration and that the invention may be modified and embodied in various other forms without departing from its spirit or the scope of the appended claims.

I claim:

1. In a vehicle, the combination comprising a mobile body, pairs of front and rear traction wheels for said body, a multi-speed transmission arranged at one side of said body, driving connections between said transmission and all of said wheels, said transmission having input shaft connecting means, and said body having a first prime mover receiving portion and a second prime mover receiving portion, said prime mover receiving portions being spaced from each other with said transmission positioned therebetween, said prime mover receiving portions and said transmission extending longitudinally on the same side of said body, said transmission adapted to be connected through said input shaft connecting means to a single prime mover positioned in one of said prime mover receiving portions.

2. In a vehicle, the combination comprising a mobile body, pairs of front and rear traction wheels for said body, a multi-speed transmission arranged at one side of said body, said transmission having a pair of input shaft connections extending longitudinally from opposite ends thereof, driving connections between said transmission and all of said wheels, and said body having a first prime mover receiving portion and a second prime mover receiving portion, said prime mover receiving portions being spaced from each other with said transmission positioned therebetween, said prime mover receiving portions and said transmission extending longitudinally on the same side of said body, said transmission adapted to be connected through one of said input shaft connections to a single prime mover positioned in one of said prime mover receiving portions.

3. In a mine haulage vehicle, the combination comprising a mobile body having a material receiving compartment extending lengthwise thereof with a material receiving end portion and a material discharging end portion, pairs of front and rear traction wheels for said body, a multi-speed transmission arranged on said body between said front and rear wheels and at one side of said compartment, said transmission having a pair of input shaft connections extending longitudinally from opposite ends thereof, driving connections between said transmission and all of said wheels, and said mobile body having a first prime mover receiving portion adjacent said material receiving portion on the same side of said body as said transmission and a second prime mover receiving portion adjacent said material discharging end portion on the same side of said body as said transmission, said transmission adapted to be connected through one of said input shaft connections to a single prime mover positioned in one of said prime mover receiving portions.

4. A vehicle comprising a mobile body having a material-receiving compartment, pairs of front and rear traction wheels for said body, a single prime mover carried by said body at one side thereof intermediate one end of said body and said adjacent traction wheel, said single prime mover adapted to drive all of said traction wheels, a selective multi-speed transmission arranged on said body at said side thereof between the adjacent front and rear wheels, said transmission having input and output shafts, a driving connection between said prime mover and the input shaft of said transmission, oppositely extending shafting driven by the output shafts of said transmission, first differential gearing arranged between said pair of front wheels and second differential gearing arranged between said pair of rear wheels, said differential gearings arranged at said side of said body and driven by said shafting, and connections between said differential gearings and said wheels including shafts extending transversely across the lower portion of said body for connecting said differential gearings to the wheels at the opposite side of said body.

5. A vehicle comprising a mobile body having a material-receiving compartment, pairs of front and rear traction wheels for said body, a single prime mover carried by said body intermediate one end of said body and said adjacent traction wheel and at one side thereof and operable to drive all of said traction wheels, a selective multi-speed transmission arranged on said body at said side thereof and located down between the adjacent front and rear wheels, said transmission having input and output shafts, a driving connection between said prime mover and the input shaft of said transmission, oppositely extending shafting driven by the output shafts of said transmission, gearing including differentials between said pair of front wheels and said pair of rear wheels, said gearing arranged at said side of said body and driven by said oppositely extending shafting, and connections between said differentials and said wheels including shafts extending across the lower portion of said body for driving said wheels at the opposite side of said body.

6. In a vehicle, a mobile body, pairs of front and rear wheels for supporting and propelling said body, a single prime mover arranged at one side of said body intermediate one end of said body and said adjacent propelling wheel and operable to drive all of said traction wheels, a selective multi-speed transmission arranged on said body at said side thereof between said front and rear wheels, a driving connection between said prime mover and said selective transmission, first differential gearing arranged between said pair of front wheels and second differential gearing arranged between said pair of rear wheels, said differential gearing arranged at said side of said body, oppositely extending driving connections between the terminal element of said transmission and said first and second differentials, speed reducing gearing for each of said wheels, and driving connections between said differentials and said speed reducing gearing including transverse shafting extending across the lower portion of said body into connection with said speed reducing gearing at the opposite side of said body.

7. A haulage vehicle comprising a mobile body having a material receiving compartment extending lengthwise thereof centrally between its sides, pairs of front and rear traction wheels, the bottom of said compartment being located below the horizontal plane of said wheel axes, a single prime mover arranged at one side of said body intermediate one end of said body and said adjacent traction wheel, said single prime mover arranged to drive all of said traction wheels, a selective multi-speed transmission arranged on said body at said side thereof between the adjacent front and rear wheels, first differential gearing arranged between said pair of front wheels, second differential gearing arranged between said rear wheels, said first and second differential gearings arranged on said side of said body, driving connections between said prime mover and said transmission including shafting extending longitudinally above the horizontal plane of said wheel axes and along said side of said body, second driving connections between said transmission and said differentials including shafting extending longitudinally in opposite directions from said transmission below the horizontal plane of said wheel axes, and third driving connections between said differential gearings and said wheels including across shafting extending transversely beneath said compartment.

References Cited in the file of this patent

UNITED STATES PATENTS

| 1,641,253 | Donon | Sept. 6, 1927 |
| 1,808,109 | Heinze | June 2, 1931 |
| 1,826,130 | Halversen | Oct. 6, 1931 |
| 1,885,427 | Gabli | Nov. 1, 1932 |
| 1,951,089 | Fielder | Mar. 13, 1934 |
| 2,488,520 | Beck | Nov. 22, 1949 |
| 2,599,061 | Lee | June 3, 1952 |
| 2,609,116 | Beck | Sept. 2, 1952 |
| 2,623,604 | Keese | Dec. 30, 1952 |
| 2,634,008 | Osgood | Apr. 7, 1953 |
| 2,698,104 | Dudley | Dec. 28, 1954 |

FOREIGN PATENTS

| 857,114 | France | Apr. 8, 1940 |
| 493,417 | Great Britain | Oct. 7, 1938 |